United States Patent Office 3,050,623
Patented Aug. 21, 1962

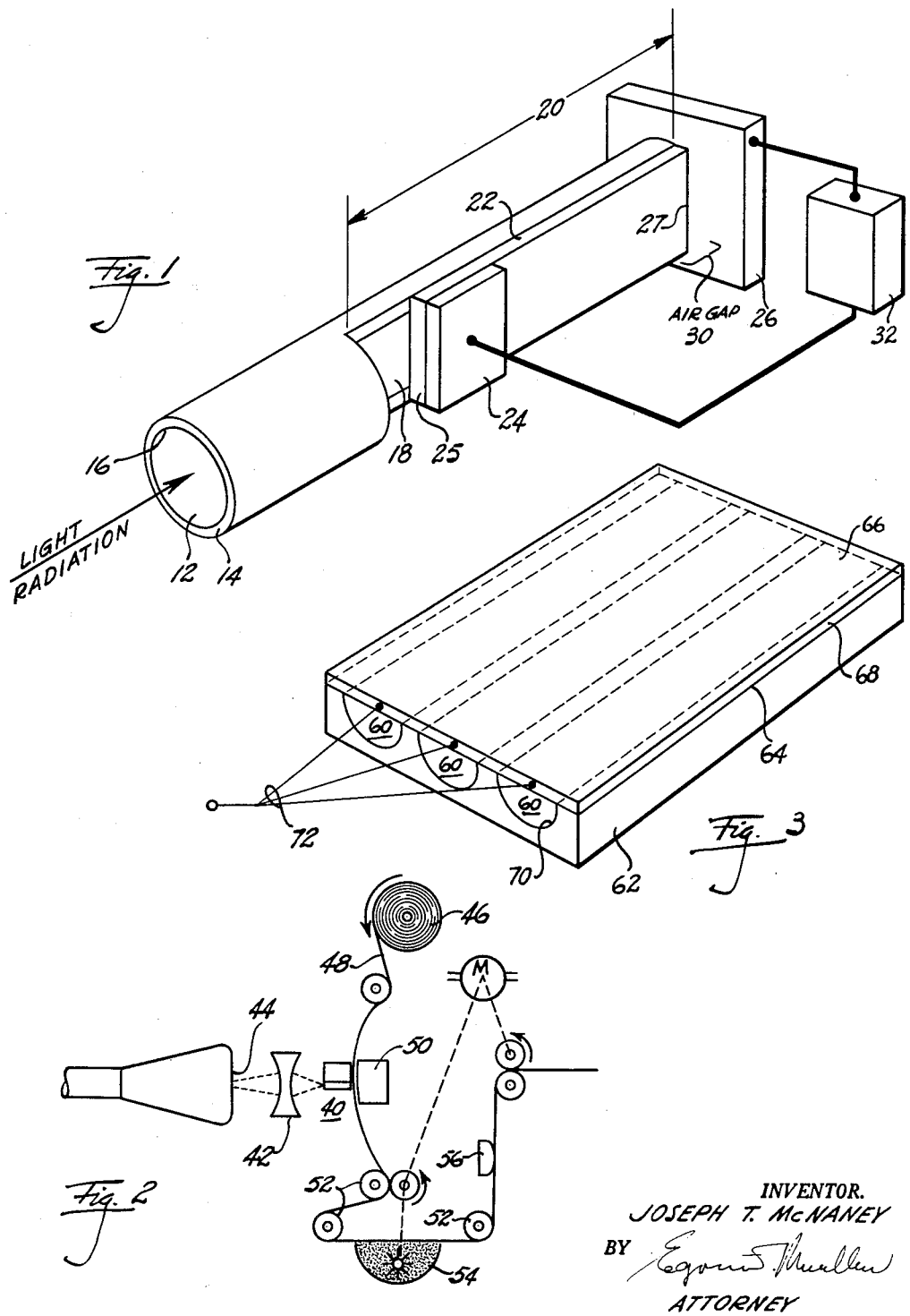
Aug. 21, 1962 — J. T. McNANEY — 3,050,623
RECORDING APPARATUS
Filed Jan. 27, 1961 — 2 Sheets-Sheet 1
INVENTOR.
JOSEPH T. McNANEY
ATTORNEY Aug. 21, 1962  J. T. McNANEY  3,050,623
RECORDING APPARATUS
Filed Jan. 27, 1961  2 Sheets-Sheet 2
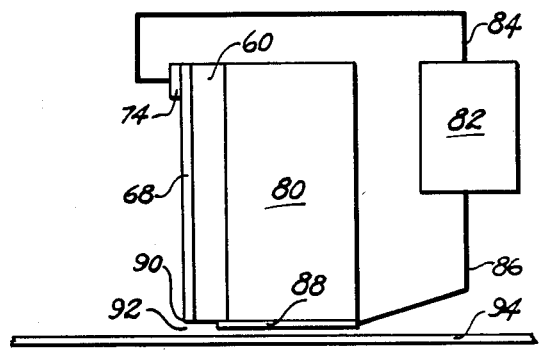
Fig. 6
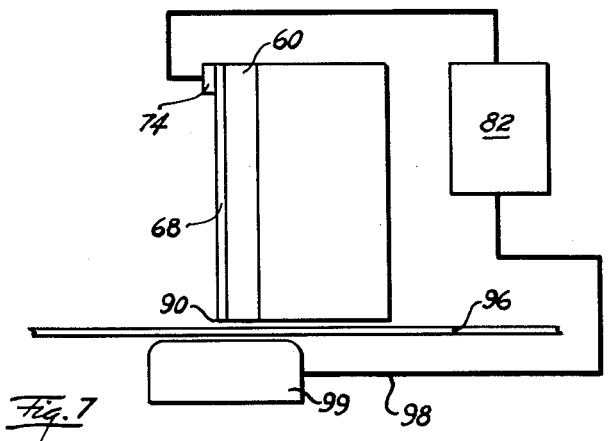
Fig. 7
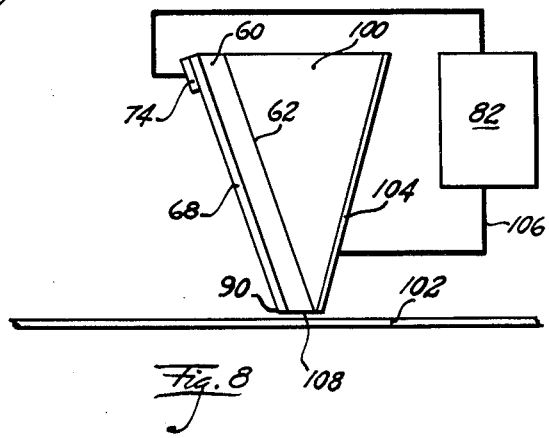
Fig. 8
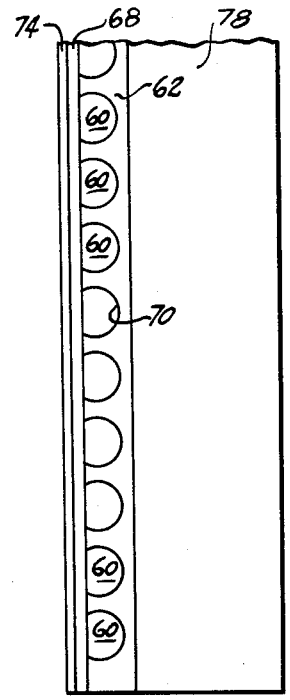
PLAN VIEW OF FIG. 5
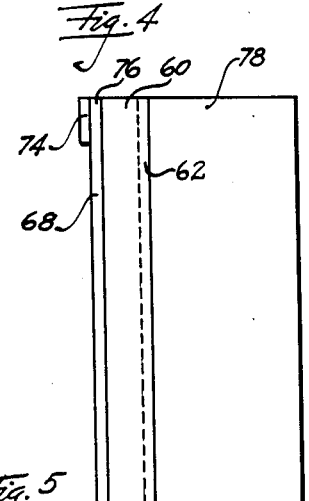
Fig. 4
Fig. 5
END VIEW OF FIG. 4
INVENTOR.
JOSEPH T. McNANEY
BY
ATTORNEY

3,050,623
RECORDING APPARATUS
Joseph T. McNaney, 8548 Boulder Drive, La Mesa, Calif.
Filed Jan. 27, 1961, Ser. No. 85,259
19 Claims. (Cl. 250—49.5)

This invention relates to an improved recording apparatus utilizing a new and novel light to electron conversion device; that device may be utilized in a system capable of transforming information presented in the form of light radiation into electrical energy and recording of such electrical energy.

The invention is an improvement in the recording apparatus which I disclosed and patented in my U.S. Patent No. 2,898,468. The device of this invention is an improvement of a construction capable of being utilized and supplanting the control element 10, shown in my aforestated patent.

In the present invention, I utilized a fiberlike light conductor, also referred to as an optical fiber, to gather and transmit the light information presented thereto. Optical fibers are well known in the art, and a recent article discussing their capability and construction has been published in "Scientific American," volume 203, No. 5, of November 1960, at pages 72 through 81 inclusive, authored by Narinder S. Katany. Light fibers, optical fibers, or glass fibers such as described by Katany may be utilized in my present inventive construction. While the invention basically may be described through the use and utilization of a single light conductor or glass fiber, in its ultimate, a control element utilizing a plurality of such light fibers may be used to increase the density of information to be utilized.

My inventive construction consists basically of a first fiber-like light conductor which has a longitudinal dimension exceeding and greater than its cross-sectional thickness or dimension. The first light conductor has an outer surface, and has a predetermined index of refraction. Then, in conformance with Katany's article, a second light conductor may partially or completely jacket or enclose the first light conductor about the outer surface. The second light conductor is provided with an index of refraction less than the predetermined index of the first light conductor. It may also be desirable to have the interspace between the first and second length conductor as smooth surfaced and as free of contamination as is possible. A portion of the outer surface of the first light conductor may be exposed by removal of the second light conductor therefrom, or in the process of creating the two together, an exposed portion of the outer surface may remain. Upon part or all of the exposed or remaining uncoated portion of the outer surface of the first light conductor, I prefer to dispose a layer of photo-conductive material. I then apply a source of potential which is provided across the photoconductive material so that the potential influence is exerted across the photoconductive material in its dark condition. As is well known, when light is applied to the photo-conductive material it becomes a conductor and will readily pass electrons therealong and therethrough.

Now with reference to the Katany article, it will be seen that light travels not in straight lines through the first light conductor, but travels at angles with light constantly bouncing from the sides of the conductor. In areas at which the second light conductor jackets or envelopes the first light conductor, the light will bounce against the interface projecting through it slightly into the second light conductor, and reflect from the interface substantially without loss completely within the first light conductor. In areas at which the photo-conductor is coated upon the optical fiber, the light is absorbed by the photoconductive material, and causes the photoconductor to lose its resistance to electrical current, and thus the photoconductor becomes illuminated, and passes electric current in its illuminated state.

The photo-conductive material will therefore, utilizing this construction, be completely illuminated, in a positive and direct manner, utilizing the illuminating light itself, absorbed by the photo-conductive material, to cause the photoconductive material to become conductive in the presence of the light, rather evenly throughout its longitudinal extent.

In addition to objects and advantages aforestated, it is an object of this invention to provide an improved recording apparatus, converting light radiation into electrical energy to permit the electrical energy to be utilized subsequently for record making purposes.

It is another object of this invention to provide an improved light radiation to electrical energy converting device which is simple in construction, positive in operation, and trouble-free in continued use.

It is another object of the present invention to utilize as a basic constituent of a light radiation to electrical energy converter, a partially jacketed light conductor having a fiber like construction, which utilizes highly stable and accurate glass fiber construction.

It is another object of this invention to provide a light radiation to electrical energy converter utilizing one or more optical glass fibers, capable of transmitting the received information with minimum distortion.

It is another object of the present invention to provide a light to electron converter capable of substantially utilizing all of the light information presented thereto in effecting the light to electron conversion, thus increasing its efficiency and sensitivity.

Other objects and advantages will appear hereinafter as a description of the invention proceeds.

The novel features that are considered characteristic of this invention are set forth with particularity in the appended claims. The invention itself, both as to its organization, and method of operation, as well as additional objects and advantages, will best be understood from the following description when read in connection with the accompanying drawings in which:

FIGURE 1 is a view in perspective of a construction utilizing a unitary fiber-like light conductor embodying the basic concepts of the invention;

FIGURE 2 is a diagrammatic representation of a system utilizing therein, one or more devices of the basic invention, as shown in FIGURE 1;

FIGURE 3 is a view in perspective of a plurality of light conductors constructed as composite devices for utilization in the system of FIGURE 2;

FIGURE 4 is a plan view of a supported block construction of a plurality of fiber-like light conductors;

FIGURE 5 is an end view of the construction of FIGURE 4;

FIGURE 6 is a diagrammatic representation of a system utilizing the optical fiber constructions of FIGURES 4 and 5 to produce electrostatic charges capable of being deposited upon a record medium;

FIGURE 7 is a diagrammatic representation of a system utilizing the optical fiber constructions of FIGURES 4 and 5 to effect a current or electrical discharge recordation of a record medium;

FIGURE 8 is a diagrammatic representation of a system utilizing the constructions of the optical fibers of FIGURES 4 and 5, wherein the optical fibers are so positioned as to provide a wedge shaped configuration of a construction otherwise similar to that of FIGURE 6, except that the mass of the support block of the optical glass fibers is reduced by the configuration.

Referring more particularly to the construction set forth in FIGURE 1, I have shown therein basically a first fiberlike conductor, light fiber, glass fiber, or optical fiber 12, at least partially jacketed by a second light conductor 14. Preferably the longitudinal dimension of light fiber 12 exceeds its cross-sectional diameter or thickness. The manner of constructing light fiber 12 and its partial jacketing 14, may be in accordance with that disclosed in the article by Katany, entitled "Fiber Optics" hereinbefore referred to. Preferably the longitudinal dimension of light fiber 12 bears a relationship to the thickness so selected that externally presented light received by the light conductor will be substantially received by it at angles of incidence greater than the critical angle of the light film. Katany teaches that both the light fiber 12, which is provided with a predetermined index of refraction, and the jacketing material 14, which may be glass and is provided with an index of refraction less than that of the fiber 12, may be drawn together. Fibers so drawn, together with their coatings, either partially or entirely coating them, may be drawing down to about 1/1000 of an inch in diameter.

A plurality of the light fibers may be drawn together, each having its longitudinal dimension exceeding its cross-sectional thickness, and each fiber spaced apart from the other, and so constituted together may be referred to as a bundle of fibers. The fibers may also be fused together with a common base material, as hereinafter described, and if desired may be drawn out a second time, so fused together, creating multiple fibers. In this latter manner resolution of multiple fibers may be effected whereby there a resolving power between 250 lines per millimeter to 500 lines per millimeter, is attained.

The indices of refraction between the two light conductor materials, say glass, utilized, need not be a wide spread difference, so long as that of fiber 12 is greater than the index of refraction of its jacketing or enveloping material 14. With the refraction difference, the light striking the interface 16 therebetween, will bounce against the interface and penetrate through the interface slightly into the jacketing 14, and be reflected therefrom into the fiber 12, virtually without any light loss in the internal reflection. If the interface 16 is made very smooth and protected from contaminating influences, virtually no light is lost in the entire total internal reflection.

The outer layer or jacketing material 14, which may be of glass, Lucite, or other like material, capable of being provided with both light conduction and a refraction index, of less than that of the light fiber 12 itself, is disposed on the outer surface of the light fiber 12 and intimately joined therewith. For purposes of the present invention, either in the drawing of the combined light fiber 12 and its jacketing coating 14, as a set of concentric cylinders, 14 over 12, or together with a common base support, a grinding operation may be effected upon a portion of the jacketed light fiber 12, 14, to remove part of the jacketing material 14 along the longitudinal extension of the light fiber 12, and part of fiber 12 if desired. On a part or all of the longitudinal extension an uncoated portion 12 of the outer surface 18 of light fibers 12 is provided. Along part or all of this outer surface, there may be disposed a photoconductive material 22, in layer form, preferably. The layer 22 of photoconductive material so disposed upon at least a portion of the uncoated portion 20 is intimately joined with the outer surface 18 of the light fiber 12. So that light traveling through the light conductor 12 will strike the photoconductive material, and the light will be absorbed by the photoconductive material. The photoconductive material is thus rendered conductive. The photoconductive material may be selected from among certain materials such as selenium, cadmium sulphide, silver selinide, germanium, sulphurs, anthracine and anthraquinone, and like materials, each of which have properties which in total darkness cause the material to be an excellent resistor to electric current, while in the presence of light illumination, the material becomes conductive, and permits electric current to pass therealong, and therethrough, as a good conductor of electricity. The photoconductive material may be utilized preferably in a thin layer along part or all of the longitudinal dimension of the uncoated portion. It is only necessary to the invention, that the photoconductive material be of sufficient length to isolate one end from the other, of the potential exerted thereacross in its dark condition.

A conductor 24 may be attached at one end of the photoconductive material 22 and another conductor 26 which may be a block of conductive material 26 if desired, and may be spaced apart from the other end 27, of the photoconductive material 22, providing an air gap 30 between the other end and the conductor 26. Thus the potential influence 32 may be exerted adjacent the other end 27. The one end 25 of the layer of photoconductive material, may have the potential directly applied thereto. The potential may be generally shown as a battery or a source of potential 32. The potential of the source 32 may be so selected as to provide the necessary potential influence across air gap 30, in the light condition of the photoconductive layer 22, so as to provide a discharge or the electrostatic charge therebetween as desired.

FIGURE 1 then exemplifies the basic concept of the invention. As hereinbefore stated a plurality of optical fibers 12 as shown in FIGURE 1, may be placed together in groups or bundles and spaced one from another, thus providing a light to electron converter 40, as shown in FIGURE 2. Converter 40 is also referred to herein as a light radiation sensitive variable resistance device. Converter 40 may be used to receive light from lens 42 originating for example, on the face of a cathode ray tube 44. The light on the face of the cathode ray tube 44 may either be in the form of shaped beams, as is exemplified in my patents, U.S. 2,735,956, or U.S. 2,761,988, or the light may just emanate from a flying spot, for example, as is also well known in the art, or a mere spot of light created by an impingement of the electrons from the electron beam upon a phosphorus screen. At any rate, any type of source 44 of light illumination with or without information upon its cross-section, may be presented. The light there presented may be gathered by lens 42 and directed onto the particular light fiber selected, or the selected group of light fibers such as are shown in FIGURE 3, grouped together or singularly applied to the light to electron converter 40. Thereafter, utilizing Xerographic recording as is exemplified in my Patent No. 2,736,770 may be utilized to record the electrical current or charge produced by converter 40. Generally speaking, there is provided on a drum 46 a supply of electrostatic charge retaining material in the form of a belt or paper 48. The paper 48 passes intermediate the converter 40 and a backing conductor 50 and as it passes therebetween in accordance with the construction shown in FIGURE 1 a charge is deposited upon the material 48 as light illumination is converted to electrons passing between converter 40 and the backing conductor 50. The current or charge is deposited upon the material 48. Paper 48 is then transported by several rollers 52, over and adjacent means for placing electrostatically attractable powder 54 against the image or charge upon the material 48, thus developing the latent electrostatic or charge image thereupon deposited, into a visual image. The visual image is then transported to a heating element 56 to be fused into the material 48 by the heat, thus providing a permanent printed record of the images. While the system of FIGURE 2 is exemplary only of one system utilizing the invention, it should be understood that further such systems as set forth in FIGURES 6, 7, and 8 are diagrammatic only, and may be substituted in place of converter 40, and the backing conductor 50.

While Katany sets forth in his article on fiber optics, hereinbefore referred to, a certain method of constructing a bundle of fibers to be placed together, I prefer to cause the fibers 60 to be placed into a backing material 62 as shown in FIGURE 3. Backing material 62 also has a lower refractive index than the light fibers 60, thus providing the jacketing material. While the entire unit may be drawn, as is explained by Katany, as a unit, it may be desirable to mold such a block, then by machining the block a flat surface is provided, giving the flat surface 64 of the block, and the flat surface 66 of the fibers. Thus the flat surface 66 of the fiber 60 may be referred to as the outer surface of the fiber 60 from which the light may leave the surface of fiber 60. Upon surface 66 may be disposed layer 68 of the photoconductive material hereinbefore set forth. While but three light conductors or light fibers 60 are so exemplified in the construction of FIGURE 3, it should be understood that this number could be 5, 10, 40, 50, or 100, or more, such as may be needed to effect the necessary resolution desired, and the showing of only three light fibers 60 is merely an exemplification of a construction which I believe to be desirable.

The layer 68 of photoconductive material, while it is shown in FIGURE 3 as being coextensive with the outer surface 66 of the light fiber 60, and with the outer surface 64 of the jacketing material 62, such need, of course, not be the case, as it is only necessary that a portion of surface 66 of the light fiber 60 have disposed thereon the photoconductive material 68. It should be understood that at all times throughout this invention, that it is only necessary to provide sufficient longitudinal dimension to the photoconductive layer to isolate, in its dark condition, the potential placed thereacross. Thus FIGURE 3 exemplifies the manner in which the light fibers or light conductors 12 of FIGURE 1 may be formed into light fiber 60, with their lower refractive index material 62 jacketing a portion of its outer surface 66 so as to provide a plurality of light fibers 60, each similar in operation to that of light fiber 12. The unit of FIGURE 3 may then be utilized in FIGURE 2 as the light converter 40. It should also be pointed out that the fibers 60, when utilized as a unit, and are preferably disposed in the backing material or glass support 62, should be spaced from each other, and the glass support 62 should coat part of the outer surface of fiber 62, and intimately joined with each of the fibers along their respective interfaces 70. Conductors 72 may then be placed at one end of the photoconductive material, to provide for the desired electrical connection thereto. Electrical connections similar to those of FIGURE 1 may be used to complete the operative unit.

The principle of the block construction of FIGURE 3 may be utilized in a construction such as is shown in FIGURE 4 in which the light fibers or light conductors 60 are imbedded in the glass support or backing material 62 and have disposed upon their surface the layer 68 of photoconductive material. The conductor 74 may be a layer of conductive material disposed along and adjacent one end 76 of the photoconductive material 68, as shown in FIGURE 5. The glass support 62 is then mounted upon, if desired, an additional support member 78 to give the glass support 62 added rigidity and support. Support member 78 may be of any desired material, such as glass, Plexiglas, Lucite or fiber plastics and the like, or may be wood, metal, etc., it serving nothing other than mechanical support for the fiber optics 60 and support 62.

An end view of the construction of FIGURE 4 is shown in FIGURE 5 wherein dotted line can be seen the longitudinal extent of fiber 60 and the longitudinal extent of the support 62 and the mechanical support 78. The conductor is shown as a layer of conductive material 74 disposed adjacent the one end 76 of photoconductive material 68. The construction, then, shown in FIGURES 4 and 5 is utilized in the exemplifications of systems utilizing that construction in FIGURES 6, 7, and 8.

As hereinbefore stated, FIGURES 6, 7 and 8 are several system modifications which may be substituted in the general overall system shown in FIGURE 2 as the converter 40 and the backing conductor 50 together with the charge receiving medium or paper 48. With this in mind, and referring to FIGURE 6 more particularly, the unit 80 comprising the construction shown in FIGURES 4 and 5, utilizes a source of potential 82, and has one of its conductors 84 attached to the conductive layer 74 upon the photoconductive layer 68, and the other of its conductors 86 attached to a conductor 88 which terminates adjacent but spaced apart from the other end 90 of photoconduct layer 68, providing an air gap 92, therebetween the other end 90 and the extent of the conductor 88. When the photoconductor therefore is illuminated by the light from the light fiber 60, a potential influence or current condition will exist between the other end 90 of the photoconductor which in its light condition is conductive, and the extremity of the conductor 88, providing electron discharge or charge therebetween in the air gap 92. These electrons may then be deposited upon the surface of the record medium 94 as electric charges and be subsequently developed as such, or removed therefrom onto other developing surfaces, as is well known and exemplified in my prior U.S. Patent No. 2,736,770.

FIGURE 7 exemplifies a modification of FIGURE 6 in which the record medium 96 is disposed between the other end 90 of photoconductor 68, and the second conductor 98 of the potential 82. The second conductor 98 is attached to a conductor 99, so that when the photoconductor 68 is illuminated by light through the light fiber 60, the current flow through the photoconductive layer 68 will be to the other end 90 thereof, through the record medium 96 and to the conductor 99, thus depositing electron charges on the record medium 96 or causing current flow therethrough. Either current sensitive recording mediums may be used for 96, or electrostatic charge sensitive mediums may be used to record on the medium 96, the electrical excitation. The current or electrostatic charges thus caused on the record medium, will be microscopically small on the record medium, as the light fiber 60 likewise may be microscopically small, as hereinbefore stated, if so desired. Thus a small recordation of current from the illuminated light fiber may be recorded on the record medium 96 and further developed as a permanent image, as shown in FIGURE 2, on the record medium 48, in place of which the record medium 96 may be substituted.

FIGURE 8 is another embodiment of a system again utilizing the construction shown in FIGURES 4 and 5, and differs from FIGURES 6 and 7 in that the support block providing the mechanical support herein designated as support block 100, may be made of a V-shaped type configuration with its apex adjacent the record medium 102. Except for changing the right rectangular end section into an oblique parallelogram shape, the photoconductor 68 and material 62 are all of the same general construction. However, it is pointed out that in this embodiment the conductor 104 to which the other conductor 106 of the source 82 of potential is connected, may, through the shape of the mechanical backing material 100, be brought adjacent the other end 90 of the photoconductive material, so as to provide an electrical discharge at the air gap 108 formed therebetween and adjacent the record medium 102. Again, as the photoconductor 68 is placed in its conductive condition through light illumination thereof, there is provided at the other end 90, a potential of the source 82 spaced apart from the conductor 104 across the air gap 108 to thus provide an electric discharge thereacross. The electrons in the air gap will be deposited upon the record medium 102, providing a record of the discharge on the medium 102. This, of course, may then again be developed as is hereinbefore set forth in FIGURE 2 and elsewhere herein.

It should, of course, be understood that many of the other embodiments embracing the general principles and constructions hereinbefore set forth, may be utilized and still be within the ambit of the present invention.

The particular embodiments of the invention illustrated and described herein are illustrative only, and the invention includes such other modifications and equivalents as may readily appear to those skilled in the arts, and within the scope of the appended claims.

I claim:

1. A first fiber-like light conductor having a longitudinal dimension exceeding its cross sectional thickness and presenting an outer surface, said light conductor having a predetermined index of refraction, a second light conductor having an index of refraction less than the predetermined index disposed upon the outer surface and intimately joined therewith, the second light conductor being disposed over and coating a predetermined portion of the outer surface so as to leave an uncoated portion of the outer surface extending generally along the longitudinal dimension, a layer of photoconductive material disposed upon at least a portion of the uncoated portion, a source of potential, means for connecting said source of potential with end of the layer, and means adjacent and spaced apart from the other end of the layer for presenting potential influence of the source of potential thereto.

2. A first fiber-like light conductor having a longitudinal dimension exceeding its cross sectional thickness and presenting an outer surface, said light conductor having a predetermined index of refraction, a second light conductor having an index of refraction less than the predetermined index, said second light conductor being disposed upon the outer surface and intimately joined with and forming an interface at and along the juncture, said interface being smooth surfaced and said juncture being free of contaminators, the second light conductor being disposed over and coating a predetermined portion of the outer surface so as to leave remaining an uncoated portion of the outer surface extending generally along the longitudinal dimension, a layer of photoconductive material disposed upon the uncoated portion, a source of potential, means for connecting said source of potential with end of the layer, and means adjacent and spaced apart from the other end of the layer for presenting potential influence of the source of potential thereto.

3. A first fiber-like light conductor having a longitudinal dimension exceeding its cross sectional thickness, said longitudinal dimension further bearing a relationship to the thickness which relationship is adapted to cause externally presented light to be received by the light conductor at angles of incidence greater than critical angle, said first conductor presenting an outer surface, said light conductor having a predetermined index of refraction, a second light conductor having an index of refraction less than the predetermined index disposed upon the outer surface and intimately joined therewith, the second light conductor being disposed over and coating a predetermined portion of the outer surface so as to leave remaining an uncoated portion of the outer surface extending generally along the longitudinal dimension, a layer of photoconductive material disposed upon the uncoated portion, a source of potential, means for connecting said source of potential with end of the layer, and means adjacent and spaced apart from the other end of the layer for presenting potential influence of the source of potential thereto.

4. A first fiber-like light conductor having a longitudinal dimension exceeding its cross sectional thickness and presenting an outer surface, said light conductor having a predetermined index of refraction, a second light conductor having an index of refraction less than the predetermined index disposed upon the outer surface and intimately joined therewith, the second light conductor being disposed over and coating a predetermined portion of the outer surface, an uncoated portion of the outer surface remaining, said uncoated portion presenting a flat surface area upon the first light conductor and extending generally along the longitudinal dimension, a layer of photoconductive material disposed upon the uncoated portion, a source of potential, means for connecting said source of potential with end of the layer, and means adjacent and spaced apart from the other end of the layer for presenting potential influence of the source of potential thereto, said layer being of a length sufficient to cause isolation of the source from the means for connecting and the means adjacent the other end.

5. A first fiber-like light conductor having a longitudinal dimension exceeding its cross sectional thickness and presenting an outer surface, said light conductor having a predetermined index of refraction, a second light conductor having an index of refraction less than the predetermined index, said second conductor being intimately joined with and jacketing a predetermined portion of the outer surface, an uncoated portion of the outer surface extending along the longitudinal dimension remaining, a longitudinally extending layer of photoconductive material disposed upon the uncoated portion, a source of potential, means for connecting said source of potential with an end of the layer, and means adjacent the other end of the layer for presenting potenial influence of the source of potential thereto, said layer in its dark condition being adapted to cause isolation of the source of potential from its ends.

6. An optical glass fiber having a predetermined index of refraction and having a predetermined cross sectional dimension presenting an outer surface generally along the longitudinal dimension of the fiber, a glass jacket having an index of refraction less than the predetermined index and coating part of the outer surface and intimately joined therewith, a longitudinally extending layer of photoconductive material disposed upon and intimately connected with an uncoated part of the outer surface, a first conductor connected operatively with the photoconductive layer at one end of the fiber, a second conductor spaced apart from the photoconductive layer at the other end thereof, and a source of potential connected across said conductors whereby said potential is presented across the photoconductor in its dark state and a spaced apart dimension.

7. A light to electron converter comprising a plurality of individually spaced apart optical glass fibers, each optical glass fiber having a predetermined index of refraction and having a predetermined cross sectional dimension presenting an outer surface generally along the longitudinal dimension of the fiber, a glass jacket having an index of refraction less than the predetermined index and coating part of the outer surface and intimately joined with each individual fiber, a longitudinally extending layer of photoconductive material disposed upon and intimately connected with an uncoated part of the outer surface, a first conductor connected operatively with the photoconductive layer at one end of the fiber, a second conductor spaced apart from the photoconductive layer at the other end thereof, and a source of potential connected across said conductors whereby said potential is presented across the photoconductor in its dark state and a spaced apart dimension.

8. A light to electron converter comprising a plurality of spaced apart optical glass fibers, each fiber having a predetermined index of refraction and having a predetermined cross sectional dimension, presenting an outer surface generally along the longitudinal dimension of the fiber, a glass support having an index of refraction less than the predetermined index, said fibers being disposed in said glass support spaced apart from each other, said glass support coating part of the outer surface and intimately joined with each of the fibers, a longitudinally extending layer of photoconductive material disposed upon and intimately connected with the uncoated part of the outer surface of each of the fibers, a first conductor connected operatively with the photoconductive layer at one end of each of the fibers, and a second conductor spaced apart from the photoconductive layer at the other end of each of the fibers, and a source of potential connected across said conductors whereby said potential is presented across the photoconductor in its dark state and a spaced apart dimension.

9. In an information recording apparatus utilizing a light to electron converter the improvement in such converter comprising a partially jacketed glass fiber, said fiber having a predetermined refractive index and the jacket having refractive index lower than the predetermined index, said fiber having a predetermined dimensional cross section and a longitudinal dimension exceeding said cross section and presenting an uncoated surface along the longitudinal dimension of the fiber, a layer of photoconductive material disposed upon the uncoated surface of the fiber, conductor means connected with one end of the layer for conducting electrons thereto, and a conductor spaced apart from the other end of the layer of photoconductive material and defining an air gap between the other end and the conductor, and a source of potential connected with the conductor means and the conductor for impressing potential there-across and across the layer of photoconductive material in its dark condition.

10. In an information recording apparatus utilizing a light to electron converter the improvement in such converter comprising a partially jacketed glass fiber, said fiber having a predetermined refractive index and the jacket having refractive index lower than the predetermined index, said fiber having a predetermined dimensional cross section and a longitudinal dimension exceeding said cross section and presenting an uncoated surface along the longitudinal dimension of the fiber, a layer of photoconductive material disposed upon the uncoated surface of the fiber, conductor means connected with one end of the layer for conducting electrons thereto, and a conductor spaced apart from the other end of the layer of photoconductive material and defining an air gap between the other end and the conductor, and a source of potential connected with the conductor means, and the conductor for impressing potential there-across and across the layer of photoconductive material in its dark condition, a record medium disposed adjacent the air gap for receiving thereupon electrons from electron discharges occurring across the air gap.

11. In an information recording apparatus utilizing a light to electron converter the improvement in such converter comprising a partially jacketed glass fiber, said fiber having a predetermined refractive index and the jacket having refractive index lower than the predetermined index, said fiber having a predetermined dimensional cross section and a longitudinal dimension exceeding said cross section and presenting an uncoated surface along the longitudinal dimension of the fiber, a layer of photoconductive material disposed upon the uncoated surface of the fiber, conductor means connected with one end of the layer for conducting electrons thereto, and a conductor spaced apart from the other end of the layer of photoconductive material and defining an air gap between the other end and the conductor, and a source of potential connected with the conductor means and the conductor for impressing potential there-across and across the layer of photoconductive material in its dark condition, a record medium disposed intermediate the conductor means and the conductor in the air gap for receiving electron charges thereupon in the conducting state of the air gap.

12. In an information recording apparatus utilizing a substantially V-shaped light-to-electron converter the improvement in such converter comprising a partially jacketed glass fiber, said fiber having a predetermined refractive index and the jacket having refractive index lower than the predetermined index, said fiber having a predetermined dimensional cross section and a longitudinal dimension exceeding said cross section and presenting an uncoated surface along the longitudinal dimension of the fiber, a layer of photoconductive material disposed upon the uncoated surface of the fiber, conductor means connected with one end of the layer for conducting electrons thereto, and a conductor spaced apart from the other end of the layer of photoconductive material and defining an air gap between the other end and the conductor, and a source of potential connected with the conductor means and the conductor for impressing potential there-across and across the layer of photoconductive material in its dark condition, a record medium disposed adjacent the vertex of the V-shaped converter for receiving electrical charge conditions thereupon in the conductive state of the layer of photoconductive material.

13. A light radiation sensitive variable resistance device comprising:
   (a) a first light conductor having a predetermined index of refraction and a longitudinal dimension exceeding its cross-sectional dimension, and presenting an outer surface generally along its longitudinal dimension;
   (b) a second light conductor having an index of refraction less than said predetermined index intimately joined with a predetermined portion of said outer surface so as to leave an uncoated portion of said outer surface extending generally along said longitudinal dimension;
   (c) a layer of photoconductive material disposed upon and intimately joined with at least a portion of said uncoated portion of said outer surface;
   (d) said second light conductor being adapted to provide reflection of light radiation presented thereto through said first light conductor and to said layer of photoconductive material.

14. A light radiation sensitive variable resistance device comprising:
   (a) a first light conductor having a predetermined index of refraction and a longitudinal dimension exceeding its cross-sectional dimension, and presenting an outer surface generally along its longitudinal dimension;
   (b) a second light conductor having an index of refraction less than said predetermined index intimately joined with a predetermined portion of said outer surfaec so as to leave an uncoated portion of said outer surface extending generally along said longitudinal dimension;
   (c) said second light conductor being adapted to receive light radiation from said first light conductor and thereupon return said light radiation to said first light conductor by reflection therefrom; and
   (d) a layer of photoconductive material disposed upon and intimately joined with at least a portion of said uncoated portion of said outer surface;
   (e) said layer of photoconductive material being adapted to receive light radiation reflected from said second light conductor.

15. A light radiation sensitive variable resistance device comprising:
   (a) a first light conductor having a predetermined index of refraction and a longitudinal dimension exceeding its cross-sectional dimension, and presenting an outer surface generally along its longitudinal dimension being of a smooth surface;
   (b) a second light conductor having an index of refraction less than said predetermined index intimately joined with a predetermined portion of said outer surface forming a smooth interface at and along the juncture;
   (c) said first light conductor presenting an uncoated portion of its outer surface extending generally along said longitudinal dimension; and
   (d) a layer of photoconductive material disposed upon and intimately joined with at least a portion of said uncoated portion of the outer surface of said first light conductor;
   (e) said second light conductor being adapted to receive light radiation from said first light conductor and redirect said light radiation to said layer of photoconductive material.

16. A light radiation sensitive variable resistance device comprising:
   (a) a first light conductor having a predetermined index of refraction and a longitudinal dimension exceeding its cross-sectional dimension, and presenting an outer surface generally along its longitudinal dimension being of a smooth surface;
   (b) a second light conductor having an index of refraction less than said predetermined index intimately joined with a predetermined portion of said outer surface forming a smooth interface at and along the juncture;
   (c) said first light conductor presenting an uncoated portion of its outer surface extending generally along said longitudinal dimension;
   (d) a longitudinally extending layer of photoconductive material, having first and second ends, disposed upon and intimately joined with at least a portion of said uncoated portion of the outer surface of said first light conductor;
   (e) said layer presenting a predetermined electrical resistance, in its dark state, intermediate the first and second ends thereof; and
   (f) said second light conductor being adapted to provide reflection of light radiation through said first light conductor and to said layer for modifying said predetermined electrical resistance intermediate the first and second ends of said layer.

17. A light-to-electron conversion device comprising:
   (a) a first light transparent material having a predetermined index of refraction and a longitudinal dimension exceeding its cross-sectional dimension, and presenting an outer surface generally along its longitudinal dimension, and first and second transverse ends;
   (b) a second light transparent material having an index of refraction less than said predetermined index intimately joined with a predetermined portion of said outer surface so as to leave an uncoated portion of said outer surface extending generally along said longitudinal dimension; and
   (c) a longitudinally extending layer of photoconductive material, having first and second ends, disposed upon and intimately joined with at least a portion of said uncoated portion of the outer surface of said first light transparent material;
   (d) said layer of photoconductive material presenting a high electrical resistance in its dark state, intermediate the first and second ends thereof;
   (e) said second light transparent material being adapted to provide the reflection of light through said first light transparent material from said first to said second transverse end, and the reflection of light to said layer of photoconductive material;
   (f) means for presenting the influence of an electrical potential between the first and second ends of said layer of photoconductive material; and
   (g) means for deriving a flow of electrons from said electrical potential upon the reflection of light from said second light transparent material to said layer of photoconductive material.

18. Means for utilization in a recording apparatus comprising:
   (a) a longitudinally extending layer of photoconductive material;
   (b) a first light conductor means having a predetermined index of refraction for supporting said layer and conducting light to said layer;
   (c) a second light conductor means jacketing said first light conducting means having an index of refraction less than said predetermined index for controlling the reflection of light through said first light conductor means and the reflection of light to said layer.

19. Means for utilization in a recording device comprising:
   (a) a longitudinally extending layer of photoconductive material;
   (b) a plurality of first light conductor means having a predetermined index of refraction for supporting said layer and conducting light to said layer;
   (c) second light conductor means jacketing each of said plurality of first light conductor means and having an index of refraction less than said predetermined index for controlling the reflection of light through said first light conductor means and reflection of light to said layer.

References Cited in the file of this patent

UNITED STATES PATENTS

| 2,898,468 | McNaney | Aug. 4, 1959 |
| 3,007,049 | McNaney | Oct. 31, 1961 |